United States Patent [19]

Shoshan

[11] Patent Number: 4,731,788

[45] Date of Patent: Mar. 15, 1988

[54] LOW DIVERGENCE LASER APPARATUS

[75] Inventor: Itamar Shoshan, Ramat Gan, Israel

[73] Assignee: El-Op Electro-Optics Industries Limited, Rehovot, Israel

[21] Appl. No.: 888,106

[22] Filed: Jul. 18, 1986

[30] Foreign Application Priority Data

May 27, 1986 [IL] Israel .......................................... 78936

[51] Int. Cl.$^4$ .............................................. H01S 3/10
[52] U.S. Cl. ....................................... 372/9; 372/106; 372/108
[58] Field of Search .................... 372/9, 106, 107, 92, 372/93, 99, 18, 98, 96, 108, 94

[56] References Cited

U.S. PATENT DOCUMENTS

| | | | |
|---|---|---|---|
| 3,609,590 | 12/1969 | Jernigan | 372/9 |
| 3,852,684 | 12/1974 | Roess et al. | 372/107 |
| 3,919,664 | 11/1975 | McAllister | 372/95 |
| 4,127,828 | 11/1978 | Klauminzer | 372/9 |
| 4,276,519 | 6/1981 | Marteau | 372/106 |

OTHER PUBLICATIONS

Hnilo et al; "A Reflection Beam Expander for Short Cavity Dye Laser"; Jun. 1980; Optics Communications; vol. 33, No. 3, pp. 311–314.
Eesley et al; "Dye–Laser Cavity Employing a Reflective Beam Expander"; Jul. 1976; IEEE Journal of Quantum Electronics; vol. QE-12, No. 7, pp. 440–442.

Primary Examiner—James W. Davie
Assistant Examiner—B. Randolph
Attorney, Agent, or Firm—Browdy and Neimark

[57] ABSTRACT

A low divergence laser oscillator of the kind wherein an intra-cavity oscillator beam is propagated along a resonator axis and within a portion of the volume of the active medium and wherein a part of the intra-cavity oscillator beam intensity is coupled out of the oscillator by a first outcoupler as an extra-cavity beam. One of the oscillator beam is expanded and collimated so as to produce an expanded and collimated extra-cavity beam having a cross-sectional area substantially greater than the cross-sectional area of a portion of the active medium. Substantially the total intensity of the expanded collimated extra-cavity beam is introduced into the active medium so as to fill a volume of the active medium which is substantially greater than the volume of the above portion, thereby giving rise to amplification of the reintroduced beam. A polarizing element located within the resonator is used for the introducing. The intra-cavity beam is either transmitted through or reflected by the polarizing element while the extra-cavity beam is directed onto the polarizing element or transmitted therethrough without passing through said first outcoupler, a second outcoupling means being provided for coupling out the amplified beam.

28 Claims, 9 Drawing Figures

LOW DIVERGENCE LASER APPARATUS

FIELD OF THE INVENTION

The present invention relates generally to a new optical configuration for laser sources, and more particularly to the design of a laser with a high-power (or high-energy) and low-divergence output beam.

BACKGROUND OF THE INVENTION

The increasing variety of laser applications in recent years has led to an increased demand for laser sources having properties suited to individual requirements. Among the properties which characterize these laser sources are the monochromatic nature of the light produced, its directionality, power and coherence. Difficulties arise in design of laser light sources because achievement of increased levels of some of these properties often presents inconsistent design constraints. An illustration of this problem can be seen in relation to the design of a laser source for increased levels of power and directionality. A measure of the directionality of a laser light beam is its divergence-angle.

In general terms, a laser system includes an active medium which is located within an optical resonator for producing an oscillator beam. In a stable laser resonator, a widely used method of achieving a low divergence, corresponding to a highly directional beam, is to introduce an aperture to narrow the oscillator beam. Such a resonator is described as having a small Fresnel number. This in turn means that the value of $D^2/L$ is small, where D is the diameter of the oscillator beam propagating inside the resonator and L is the resonator length.

For example, the lowest divergence, corresponding to the diffraction-limit, is achieved when $D^2/L$ is of the order of magnitude of the wavelength of the laser. For a wavelength of 1 micron and a 1 m long resonator, the diameter of the intracavity aperture which determines the width of the oscillator beam is therefore limited to about 1 mm. However, with this small aperture, a narrow oscillator beam is produced during lasing action which utilizes only a small portion of the volume of the active medium. As a result of the limited exploitation of the active medium volume, the output power is substantially reduced and the laser is inherently inefficient. It would therefore be desirable to have a laser which achieves a high output power by exploiting more of the active medium volume while still maintaining a low divergence and high efficiency.

One solution that has been proposed for increased efficiency is to reduce the volume of the active medium through reduction of its diameter. This has the effect of increasing the proportion of the active medium volume which is utilized by the oscillator beam. This solution is used in some laser systems (e.g. He-Ne lasers and some $CO_2$ lasers). In solid-state lasers, however, the use of a thin rod (e.g. 1 or 2 mm in diameter) to reduce the active medium volume is impractical because of mechanical strength considerations and because of poor coupling with the flashlamp used as the optical pumping source.

A better solution for utilization of the active medium is provided by the use of an unstable resonator. This method is described for example by Herbst et al in *Optics Communications*, volume 21, page 5 (1977). With this design, a very low divergence is obtained at a high output power and the whole volume of the active medium is utilized. An important drawback of this design, however, is the very high oscillation threshold which results in a low efficiency of the laser.

Another solution to the active medium utilization problem is based on the so-called "telescopic resonator" as described for example by Hanna et al in *Optics Communications*, volume 37, page 359 (1981). In this design, a beam expander is inserted into a stable resonator. On one side of the beam expander where the active medium is located, the oscillator beam is wide thereby utilizing the whole volume of the active medium. On the other side of the beam expander, the oscillator beam is narrow thereby maintaining a small effective Fresnel number of the resonator. This approach provides a high power, low divergence output beam at a good efficiency. However, an inherent disadvantage of the design is the very high power density in the narrow oscillator beam which is liable to cause damage to optical components on that side of the beam expander.

Still another prior art proposal for a solution to the active medium utilization problem is found in the disclosure in U.S. Pat. No. 3,852,684 (Roess et at). This patent discloses a laser device for generating a laser beam having a fundamental mode, which device uses a portion of a laser active material as the oscillator and the remaining portion as an amplifier so that the energy stored in the laser material is fully exploited. The laser device comprises a laser active material, a pair of small mirrors designed to form an optical resonator utilizing a portion of the laser active material with the remaining portion of the material being an amplifier portion. One of the pair of mirrors is partially transparent to the light so as to enable decoupling of the beam from the resonator. The device furthermore comprises a matching optical system including means for directing a laser beam decoupled from the optical resonator portion through the amplifier portion of the laser active material for amplification.

Another prior proposal, similar to that of Roess, is to be found in U.S. Pat. No. 4,276,519 (Marteau). Here, as with Roess, amplification is achieved and in consequence laser efficiency is improved. However in both cases power losses occur as a result of the fact that the expanded output beam, when returned to the active medium for amplification, is reflected along its output path so that at least a portion of it has to pass through the oscillator output mirror without 100% transmission. As a consequence, the high reflection losses in this output mirror substantially reduce the intensity of the expanded beam, thereby reducing the efficiency of the laser device. Whilst with such arrangements, by virtue of the fact that more of the volume of the active medium is used amplification is achieved, these designs suffer however, as indicated above, from losses inherent in the fact that return of the beam for amplification takes place through the partially transparent mirror.

SUMMARY OF THE INVENTION

It is accordingly a principal object of the present invention to overcome the above-mentioned disadvantages and provide a laser which is efficient, utilizes a large-volume active medium and has a low divergence output beam.

According to one aspect of the present invention, there is provided a low divergence laser oscillator of the kind wherein an intra-cavity oscillator beam is propagated along a resonator axis and within a portion of the volume of the active medium and wherein a part of said intra-cavity oscillator beam intensity is coupled out of the oscillator by a first outcoupling means as an extra-cavity beam, the improvement comprising: beam expanding and collimating means for subjecting one of said oscillator beams to expansion and collimation so as to produce an expanded and collimated extra-cavity beam having a cross-sectional area substantially greater than the cross-sectional area of said portion of the active medium; introducing means for introducing substantially the total intensity of the expanded collimated extra-cavity beam into said active medium so as to fill a volume of the active medium substantially greater than the volume of the said portion, thereby giving rise to amplification of said reintroduced beam, said introducing means including a polarising element located within the resonator and through which the intra-cavity beam is transmitted whilst the extra-cavity beam is directed onto said polarising element without passing through said first outcoupling means for reflection into said active medium; and a second outcoupling means for coupling out said amplified beam.

Alternatively, and in accordance with another aspect of the present invention, the polarising element serves to reflect the intra-cavity beam whilst the expanded, extra-cavity beam is directed therethrough without passing through said first outcoupling means for transmission into the active medium.

BRIEF DESCRIPTION OF THE DRAWINGS

For a better understanding of the invention with regard to the embodiments thereof, reference is made to the accompanying drawings, in which:

Referring to FIG. 1, there is here shown a schematic diagram of one embodiment of a solid state laser system in accordance with the present invention. The laser oscillator is provided by an active medium 17 in the form of a rod which is optically pumped by a flashlamp (not shown) and which is disposed between two total reflecting mirrors 18 and 19 defining a stable resonator 20 with axis 21. One or both of these mirrors can be replaced by reflectors of other types, such as porro-prisms or corner-cubes. An intracavity aperture 22 disposed proximate reflecting mirror 19 provides transverse mode selection. To achieve low divergence, the diameter of the aperture 22 must be small, thereby reducing the Fresnel number of the resonator 20. As previously described, this imposes a constraint on the available power output as only the inner portion 23 of the active medium 17 volume contributes to generation of the narrow intra-cavity oscillator beam 24. However, and as shall be seen in accordance with the invention, the output power is increased by exploiting the whole volume of the active medium 17.

Figure 1:
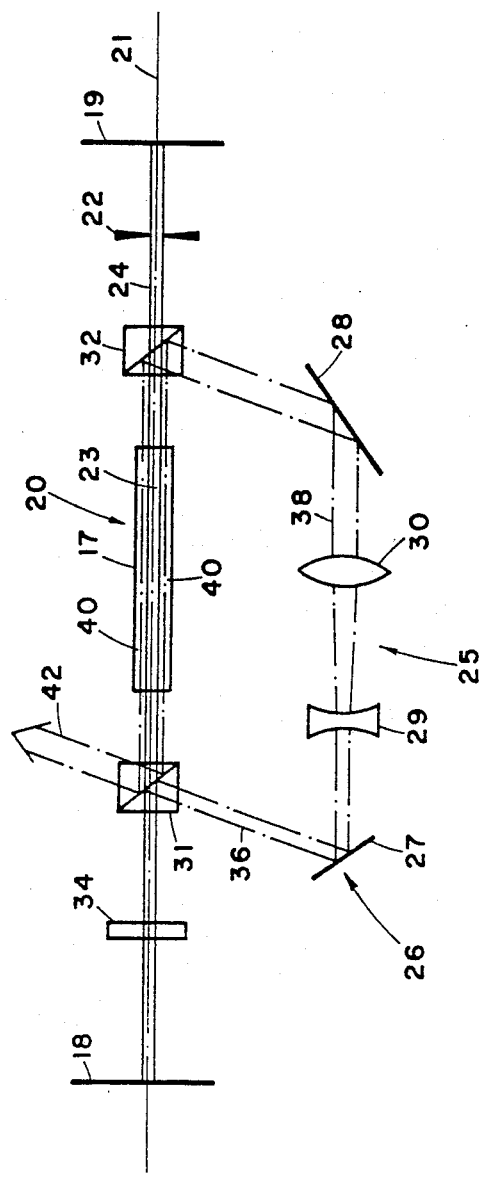
FIG. 1 shows a schematic diagram of a solid-state laser system utilizing a pair of polarisers in accordance with the principles of the invention.

The laser system of the present invention is provided with a beam expander 25 located external to resonator 20 and disposed along an optical path 26 containing a pair of folding mirrors 27 and 28. Typically, the beam expander 25 is provided as a pair of concave and convex lenses 29 and 30 as shown in FIG. 1 or as in one of the alternative embodiments shown in FIGS. 8 and 9 and described further herein. The resonator 20 is coupled to optical path 26 by polarisers 31 and 32, typically provided as polarization beam splitters.

In operation, the polarization of the intracavity oscillator beam 24 is established as p-polarization by the polarisers 31 and 32 in the configuration shown in FIG. 1. A portion of this oscillator beam 24 is transformed into the s-polarization by a retardation plate 34 and coupled out of the resonator 20 as an extra-cavity beam 36 on one side of the active medium 17 by the polariser 31 constituting a first outcoupling means. This s-polarized beam 36 is fed into the optical path 26 where it is reflected by mirror 27 and is then expanded and collimated by passage through beam expander 25. The s-polarized expanded beam 38 is then reflected by mirror 28 and returned collimated into the other side of the active medium 17 via polariser 32 constituting an introducing means. The expanded beam 38 is then amplified, and because the resulting amplified beam is also s-polarized, it can be coupled out of the laser system by the polariser 31 (constituting a second outcoupling means) as an output beam 42.

By appropriate selection of the diameter of aperture 22 and the magnification ratio of the beam expander 25, the diameter of the expanded beam 38 is made to match the active medium 17 diameter, so that the whole volume of the active medium 17 is utilized. That is, the inner portion 23 of the active medium 17 is utilized by the p-polarized intracavity oscillator beam 24 while the outer portion 40 provides the amplification of the s-polarized collimated expanded beam 38.

The divergence of the output beam 42 is low by virtue of the small Fresnel number of the resonator 20. This divergence may even be diffraction-limited by a suitable choice of the diameter of aperture 22 and of the resonator length defined as the distance between reflecting mirrors 18 and 19.

Thus, with the arrangement just described the following advantages are achieved:

1. The whole volume of the active medium 17 is exploited, since the expanded beam 38 is well collimated by the beam expander 25, and maximum efficiency is achieved. For the case where the active medium 17 is a cylindrical rod, the beam expander is adapted so that the expanded beam 38 just matches the diameter of the active medium 17. Even if the expanded beam 38 has a diameter just greater or less than that of the active medium 17, nevertheless an improvement in efficiency is obtained over prior art designs.

2. In view of the fact that the expanded extra-cavity beam is reflected into the active medium by the polariser 32 without having to pass through the first outcoupling means there is no significant loss involved in the reintroduction of the expanded extra-cavity beam into the active medium. This results from the use of separate first outcoupling and introducing means, so that the functions of coupling out the extra-cavity beam 36 and returning the expanded beam 38 are separated. Thus, optimal results are achieved as the return of the expanded beam 38 through the polariser 32 is not affected by the outcoupling ratio determined by the retardation plate 34 so that it does not interfere with the operation of the resonator 20. Polariser 31 couples a portion of the oscillator beam 24 into the optical path 26 as extra-cavity beam 36. This portion may be adjusted by rotation of the retardation plate 34 to the optimal outcoupling ratio to obtain maximum efficiency of the laser oscillator. However, regardless of this adjustment, since the expanded beam 38 is s-polarized, it is almost entirely reflected by polarizer 32 towards the active medium 17. After amplification, it is similarly reflected during subsequent outcoupling by the polariser 31. Thus, there is practically no loss in the return of the expanded beam 38 to the active medium 17; this without adversely affecting the efficiency of the oscillator. This is in contrast to the Roess and Marteau proposals referred to above, wherein the attempt to reduce the losses in the return of the expanded beam to the active medium adversely affects the efficiency of the oscillator.

Another feature of the present invention is the planar wavefront characteristic of the intracavity oscillator beam 24. This is in contrast to the spherical wavefront characteristic of the intracavity beam in an unstable resonator. Thus, dispersive elements such as a diffraction grating or an etalon can be easily incorporated into the resonator 20 of the invention for spectral narrowing and tuning purposes.

In the preferred embodiment just described, the oscillator beam 24 is shown as having p-polarization. However, by appropriate positioning of the polarizers 31 and 32, an s-polarization resonator can be provided such that oscillator beam 24 is s-polarized while the extra-cavity beam 36, the expanded beam 38 and output beam 42 are all p-polarized.

The invention is applicable to all types of lasers—either pulsed or continuous—with a gaseous, liquid or solid-state active medium. The invention is also applicable to lasers comprising internal switches such as Q-switched, mode-locked or cavity-dumped lasers. Further, the invention may be used in combination with various types of laser resonators—stable, unstable, ring-type, diffraction-coupled or others.

According to the required performance of the laser, the diameter of aperture 22 and the magnification ratio of beam expander 25 are design parameters that should be determined as a trade-off between good divergence and good efficiency.

A specific illustration of the invention is now presented through a description of the design parameters of a neodymium:YAG solid-state laser.

The active medium 17 is made of an anti-reflection coated Nd:YAG rod 6.3 mm in diameter and 100 mm long. Mirrors 18 and 19 are 100% reflecting mirrors at 1.06 microns. The retardation plate 34 is a quarter-wave plate for 1.06 microns adjusted for maximum output energy. Beam expander 25 is made of two single lenses with a ×1.7 magnification ratio. The aperture 22 diameter is adjusted to 4 mm. Optical pumping of the laser rod active medium 17 is performed in a close-coupled cavity by a xenon-filled flashlamp with a bore diameter of 4 mm and an arc length of 88 mm. Cooling of the laser rod is achieved by circulating water. The resonator length is 70 cm.

The laser system can be operated at an electrical input of 10 joules per pulse at a repetition rate of 20 pps. Characteristic measurements of the output beam 42 show an output energy of 220 millijoules and a far-field divergence of 1.1 milliradians. In another embodiment, insertion of a Q-switch into the laser resonator 20 between aperture 22 and mirror 19 provided pulses of 20 nanoseconds with 160 millijoules per pulse.

There are shown in FIGS. 2-9 a number of alternative embodiments in accordance with the invention which illustrate variations in optical components and arrangements of the resonator and optical path, and these are now described. Like numerals refer to like portions of the previous figures.

Figure 2:
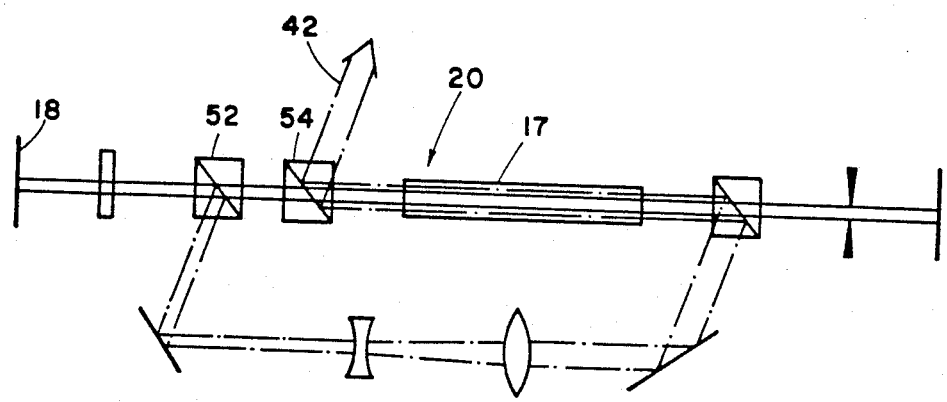
FIG. 2 shows an alternative embodiment of the invention configured such that a third polariser is utilized.

Referring now to FIG. 2, there is shown an alternative embodiment of the invention configured such that two separate polarisers 52 and 54 are substituted in the place of polariser 31 of FIG. 1. In this arrangement an extra-cavity beam 36 is coupled out by the polariser 52 (constituting a first outcoupling means) while polariser 54 (constituting a second outcoupling means) couples out the output beam 42.

Figure 3:
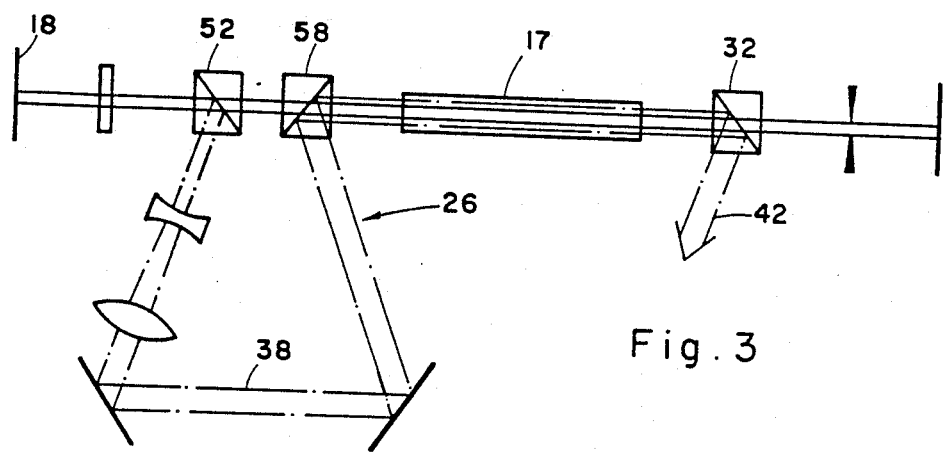
FIG. 3 shows a modification in the optical path of the configuration of FIG. 2.

FIG. 3 illustrates another alternative embodiment of the invention configured such that optical path 26 is modified and folded between polarisers 52 and 58 with polariser 58 returning the expanded beam 38 to the active medium 17 wherein it is amplified and then coupled out after amplification by polariser 32 as output beam 42.

Figure 4:
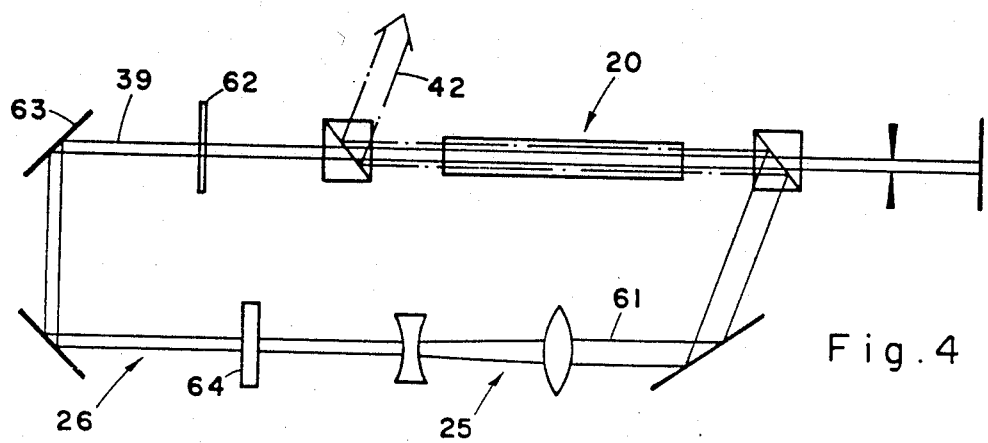
FIG. 4 shows an alternative embodiment of the invention configured such that a partially reflecting mirror is utilized in the system of FIG. 1.

FIG. 4 illustrates another alternative embodiment of the invention configured such that a p-polarized extra-cavity beam 39 is coupled out of the resonator 20 by a partially reflecting mirror 62 which is substituted for reflecting mirror 18. Additional folding mirror 63 completes the optical path 26. In this arrangement, there is no need for locating the retardation plate 34 within the resonator 20. Instead, a half wave plate 64 is placed in the optical path 26 on either side of beam expander 25 in order to transform the p-polarization of the extra-cavity beam 39 into an s-polarized expanded beam 61 which is coupled out after amplification as output beam 42.

Figure 5:
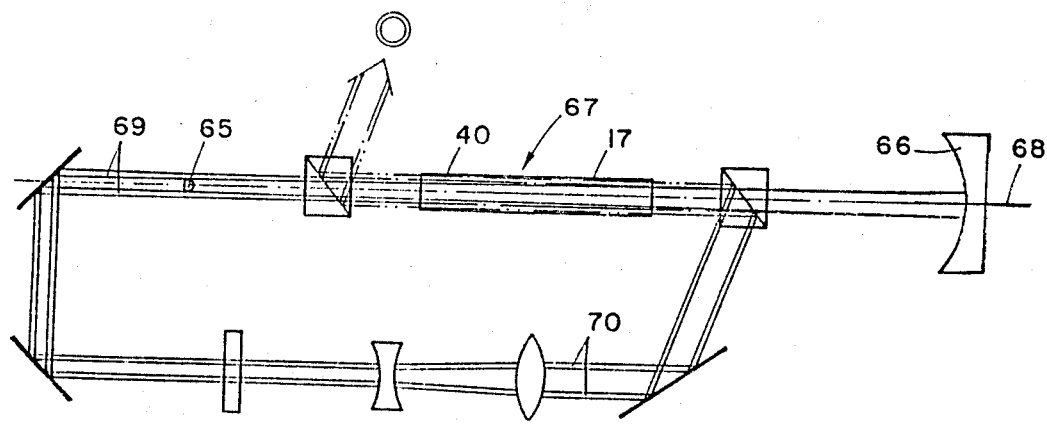
FIG. 5 shows an alternative embodiment of the invention using an unstable resonator.

FIG. 5 illustrates another embodiment similar to that shown in FIG. 4 except that spherical mirrors 65 and 66 replace mirrors 62 and 19. Mirror 65 is a small convex type, and mirror 66 is a large concave type, and together they define a diffraction-coupled unstable resonator 67 having axis 68, a configuration similar to that described earlier in connection with the prior art by Herbst. In this configuration, there is no need for placement of aperture 20 in the resonator 67 since the generated output beam 69 is almost diffraction-limited. As a result of the diffraction outcoupling, the extra-cavity beam 69 has an annular cross-section. The expanded beam 70 is also annular so that it can be made to exactly match the unused outer portion 40 of active medium 17 for maximum efficiency of the laser system.

Figure 6:
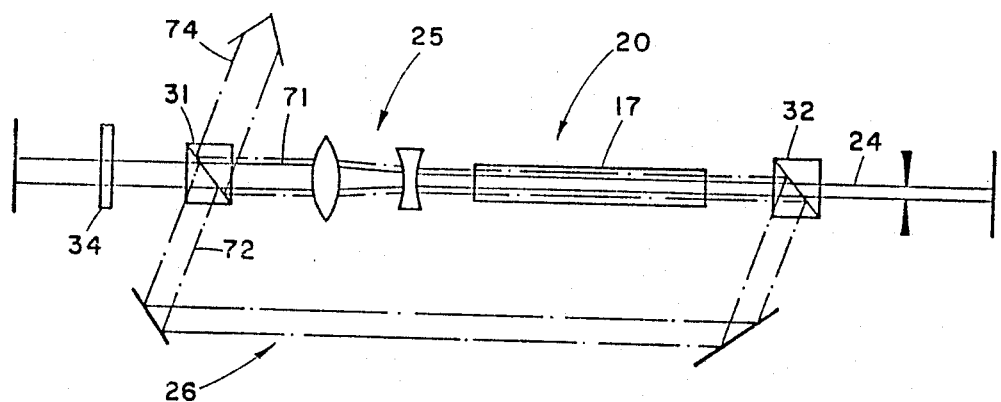
FIG. 6 shows an alternative embodiment of the invention configured such that the beam expander is positioned inside the resonator.

In the preferred embodiment illustrated in FIG. 1, the beam expander 25 is located external to the resonator 20. In a modified arrangement the beam expander 25 can be positioned inside the resonator 20 as illustrated in FIG. 6. On the side of the beam expander 25 adjacent the active medium, the intra-cavity beam is narrowed while on the other side of the beam expander 25 the intra-cavity beam is expanded. Retardation plate 34 transforms a portion of the expanded beam 71 to s-polarization and this portion is then coupled out of the resonator 20 as extra-cavity beam 72 which is returned to the active medium 17 for amplification via optical path 26 and polariser 32. Upon passing through the active medium 17, the amplified beam is expanded and coupled out as output beam 74 by polariser 31. This configuration has the advantage of reduced intensity in the region of the resonator 20 where the expanded beam 71 has a large cross-section, and this is useful in lasers that contain optical elements with a low damage threshold as, for example, a Q-switching crystal or a diffraction grating.

Figure 7:
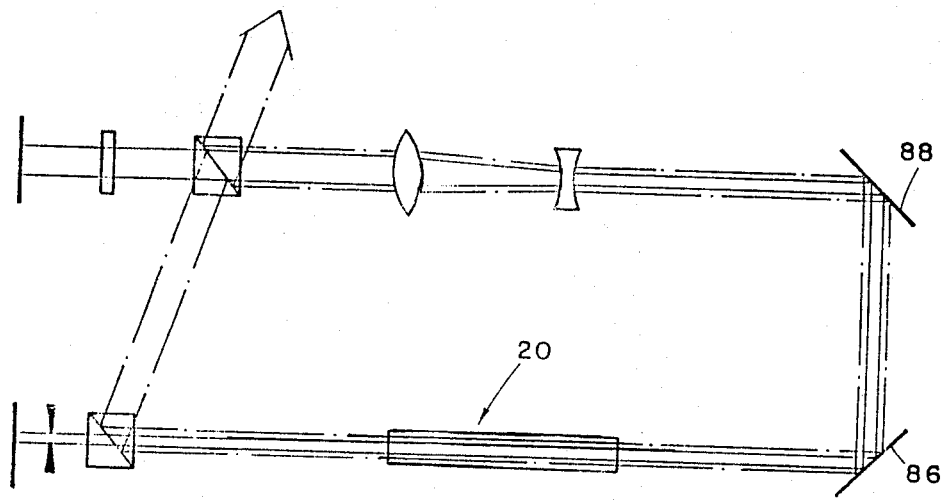
FIG. 7 shows an alternative arrangement configured such that the resonator of FIG. 6 is folded.

FIG. 7 illustrates an alternative embodiment of the invention based on the configuration of FIG. 6 wherein resonator 20 is folded by the use of two folding mirrors 86 and 88. Alternatively, a folding prism can be used. This configuration offers the advantage of compactness. The concept of the folded resonator can be applied to the other embodiments shown in FIGS. 1–5.

Figure 8:
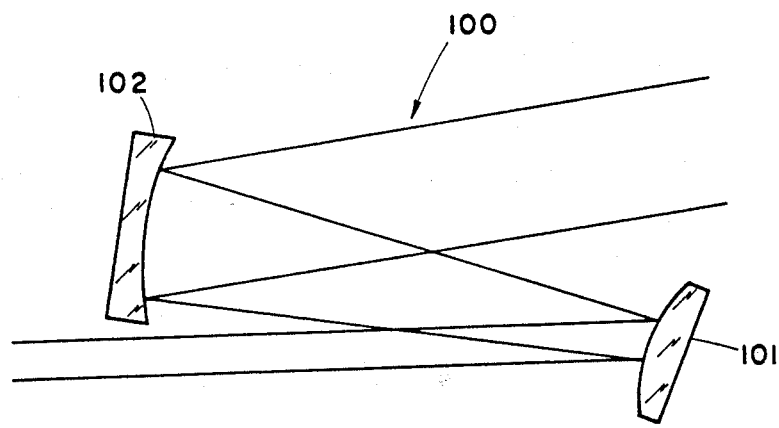
FIG. 8 shows a modified form of the beam expander for use in the alternative embodiments.

FIG. 8 illustrates a beam expander 100 as an alternative embodiment of the beam expander 25 of the previous figures. The lenses of beam expander 25 are replaced by curved mirrors 101 and 102.

Figure 9:
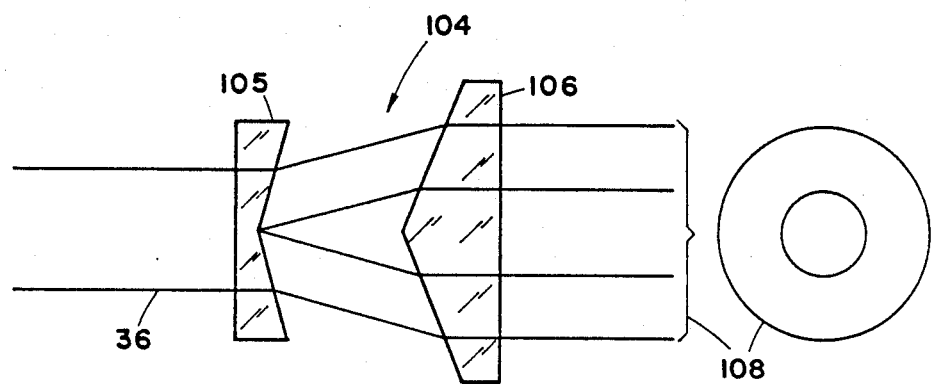
FIG. 9 shows another modified form of the beam expander for use in the alternative embodiments.

FIG. 9 illustrates an "axicon beam expander" 104 that may be used in an improved alternative embodiment of the invention instead of the conventional beam expander 25. This beam expander 104 is formed by a pair of optical elements 105 and 106 each with a conical shape called "axicon". The narrow output beam 36 incident on the first axicon is expanded to a beam 108 having an annular cross-section that matches exactly the unexploited region corresponding to the outer portion 40 of the active medium 17 shown in FIG. 1. In this way an improved efficiency may be obtained.

Thus, in accordance with the present invention, a laser system is provided in which a high-power, low-divergence output beam is produced by exploitation of the whole volume of an active medium through use of a beam expander in an optical path configuration designed to minimize losses.

While the principles of the invention have been described above in connection with specific apparatus and applications, it is to be understood that the description is made by way of example only and not as a limitation on the scope of the invention.

I claim:

1. In a low divergence laser oscillator of the kind wherein an intra-cavity oscillator beam is propagated along resonator axis and within a portion of the volume of the active medium and wherein a part of said intra-cavity oscillator beam intensity is coupled out of the oscillator by a first out-coupling means as an extra cavity oscillator beam, the improvement comprising beam expanding and collimating means for subjecting one of said oscillator beams to expansion and collimation so as to produce an expanded and collimated extra-cavity beam having a cross-sectional area substantially greater than the cross-sectional area of said portion of the active medium; introducing means for introducing substantially the total intensity of the expanded collimated extra cavity beam into said active medium as a reintroduced beam so as to fill a volume of the said portion, thereby giving rise to amplification of said reintroduced beam so as to produce an amplified beam, said introducing means including a polarizing element located within the resonator and through which the intra-cavity beam is transmitted whilst the expanded extra-cavity beam is directed onto said polarizing element without passing through said first outcoupling means for reflection into said active medium; and a second outcoupling means for coupling out said amplified beam.

2. In a low divergence laser oscillator of the kind wherein an intra-cavity oscillator beam is propagated along a resonator axis and within a portion of the volume of the active medium and wherein part of said intra-cavity oscillator beam intensity is coupled out of the oscillator by a first out-coupling means as an extra-cavity oscillator beam, the improvement comprising beam expanding and collimating means for subjecting one of said oscillator beams to expansion and collimation so as to produce an expanded and cullimated extra-cavity beam having a cross-sectional area substantially greater than the cross-sectional area of said portion of the active medium; introducing means for introducing substantially the total intensity of the expanded collimated extra cavity beam into said active medium as a reintroduced beam so as to fill a volume of the active medium substantially greater than the volume of the said portion, thereby giving rise to amplification of said reintroduced beam so as to produce an amplified beam, said introducing means including a polarizing element located within the resonator for reflecting said intra-cavity beam whilst the expanded extra-cavity beam is directed therethrough without passing through said first outcoupling means for transmission into said active medium; and a second outcoupling means for coupling out said amplified beam.

3. The improvement according to claim 1 wherein said first and second outcoupling means are constituted by a single component.

4. The improvement according to claim 2 wherein said first and second outcoupling means are constituted by a single component.

5. A laser device including a low divergence laser oscillator of the kind wherein an intra-cavity beam is propagated within an optical resonator along a resonator axis and within an oscillator portion of the volume of an active medium, and wherein a part of said intra-cavity beam intensity is coupled out of the oscillator by a first outcoupling means as an extra-cavity beam, propagating along an optical path external to said optical resonator, characterized in that there is provided:
   an introducing means positioned within said optical resonator and in said optical path for directing said extra-cavity beam into said active medium as a reintroduced beam, so that a closed loop is formed by said optical path and said resonator axis,
   a second outcoupling means within said optical resonator for extracting out of said laser device said reintroduced beam after amplification in said active medium as an output beam, and
   a beam expanding means positioned within said closed loop for expanding the beam therein such that the cross-sectional area of said reintroduced beam as it enters said active medium is substantially greater than that of said oscillator portion;
   wherein said introducing means and said second outcoupling means include a polarizing element and
   an arrangement is such that said intra-cavity beam and said reintroduced beam propagating along said active medium are linearly polarized at planes substantially orthogonal to each other.

6. A laser device according to claim 5, wherein said first outcoupling means includes a polarizing element.

7. A laser device according to claim 5, wherein said polarizing elements are constituted by polarization beam-splitting cubes.

8. A laser device according to claim 6, wherein said laser oscillator includes a retardation plate which determines the outcoupling ratio of said first outcoupling means.

9. A laser device according to claim 6, wherein said first outcoupling means and second outcoupling means are constituted by a single element.

10. A laser device according to claim 6, wherein the cross-sectional area of said reintroduced beam is substantially equal to that of said active medium.

11. A laser device according to claim 5, wherein said laser oscillator includes aperture defining means for determining the cross-sectional area of said oscillator portion of the active medium.

12. A laser device according to claims 5 or 11 wherein said oscillator portion is located about an innermost longitudinal portion of said active medium.

13. A laser device according to claim 5, wherein said active medium is a solid-state laser material.

14. A laser device according to claim 13, wherein said solid-state laser material is a Neodymium-YAG crystal.

15. A laser device according to claim 13, said solid-state laser material is in the form of a cylindrical rod.

16. A laser device according to claim 5, wherein said first outcoupling means includes a partially reflecting mirror, and polarization-rotating means is provided for rotating the polarization plane of said extra-cavity beam.

17. A laser device according to claim 16, wherein said polarization-rotating means is a half-wave plate.

18. A laser device according to claim 5, wherein said laser oscillator includes a folded resonator.

19. A laser device according to claim 18, wherein said first outcoupling means and said introducing means are formed from a pair of proximate polarizing elements.

20. A laser device according to claim 5, wherein said beam expanding means is located in said optical path external to said optical resonator.

21. A laser device according to claim 5, wherein said beam expanding means is located within said optical resonator between said introducing means and said second outcoupling means.

22. A laser device according to claim 5, wherein said beam expanding means includes lenses.

23. A laser device according to claim 5, wherein said beam expanding means includes non-planar mirrors.

24. A laser device according to claim 5, wherein said beam expanding means includes axicon elements.

25. A laser device according to claim 5, wherein said laser oscillator includes an unstable resonator.

26. A laser device according to claim 5, wherein said laser oscillator is a Q-switched laser oscillator.

27. A laser device according to claim 5, wherein said intra-cavity beam is p-polarized and said reintroduced beam is s-polarized.

28. A laser device according to claim 5, wherein said intra-cavity beam is s-polarized and said reintroduced beam is p-polarized.

* * * * *